(12) United States Patent
Huang et al.

(10) Patent No.: US 8,385,070 B2
(45) Date of Patent: Feb. 26, 2013

(54) PORTABLE ELECTRONIC DEVICE

(75) Inventors: Yi-Chang Huang, Xindian (TW);
Yao-Chung Lin, Xindian (TW)

(73) Assignee: HTC Corporation, Taoyuan (TW)

( * ) Notice: Subject to any disclaimer, the term of this patent is extended or adjusted under 35 U.S.C. 154(b) by 1454 days.

(21) Appl. No.: 11/414,298

(22) Filed: May 1, 2006

(65) Prior Publication Data
US 2006/0262500 A1 Nov. 23, 2006

(30) Foreign Application Priority Data

May 19, 2005 (TW) ................. 94116265 A

(51) Int. Cl.
*H05K 7/20* (2006.01)

(52) U.S. Cl. ............... 361/709; 361/679.46; 361/727; 361/760; 257/720; 165/80.2; 174/252

(58) Field of Classification Search ........ 361/687, 361/699, 679.08, 679.13, 679.47, 679.55, 361/700, 810, 679.46, 701–722, 727–728, 361/730, 752, 757, 760, 761; 165/104.33; 439/326, 331; 455/575.3–575.4
See application file for complete search history.

(56) References Cited

U.S. PATENT DOCUMENTS

| | | | | |
|---|---|---|---|---|
| 5,272,599 A * | 12/1993 | Koenen | ............ | 361/710 |
| 5,379,185 A * | 1/1995 | Griffin et al. | ............ | 361/709 |
| 5,543,663 A * | 8/1996 | Takubo | ............ | 257/720 |
| 5,581,443 A * | 12/1996 | Nakamura et al. | ............ | 361/705 |
| 5,777,844 A * | 7/1998 | Kiefer | ............ | 361/704 |
| 5,872,699 A * | 2/1999 | Nishii et al. | ............ | 361/699 |
| 5,972,736 A * | 10/1999 | Malladi et al. | ............ | 438/118 |
| 6,026,888 A * | 2/2000 | Moore | ............ | 165/80.3 |
| 6,073,027 A * | 6/2000 | Norman et al. | ............ | 455/575.4 |
| 6,208,526 B1 * | 3/2001 | Griffin et al. | ............ | 361/785 |
| 6,468,101 B2 * | 10/2002 | Suzuki | ............ | 439/326 |
| 6,487,073 B2 * | 11/2002 | McCullough et al. | ............ | 361/687 |
| 6,839,231 B2 * | 1/2005 | Fleck et al. | ............ | 361/687 |
| 6,890,203 B2 * | 5/2005 | Matsunaga et al. | ............ | 439/331 |
| 7,130,195 B2 * | 10/2006 | Kawano et al. | ............ | 361/719 |
| 7,188,484 B2 * | 3/2007 | Kim | ............ | 62/259.2 |
| 7,292,441 B2 * | 11/2007 | Smalc et al. | ............ | 361/704 |
| 7,303,820 B2 * | 12/2007 | Capp et al. | ............ | 428/408 |
| 7,330,354 B2 * | 2/2008 | Watanabe | ............ | 361/705 |
| 2002/0064024 A1 * | 5/2002 | McCullough et al. | ............ | 361/687 |
| 2003/0139142 A1 * | 7/2003 | Wang | ............ | 455/67.1 |
| 2004/0130869 A1 | 7/2004 | Fleck et al. | | |
| 2004/0132503 A1 | 7/2004 | Chiu | | |
| 2004/0136162 A1 * | 7/2004 | Asai et al. | ............ | 361/715 |

(Continued)

FOREIGN PATENT DOCUMENTS

| | | |
|---|---|---|
| CN | 1625327 A | 6/2005 |
| TW | 580162 | 3/2004 |

(Continued)

*Primary Examiner* — Courtney Smith
(74) *Attorney, Agent, or Firm* — Birch, Stewart, Kolasch & Birch, LLP

(57) ABSTRACT

A portable electronic device comprises a housing, a circuit board, a heat-conduction structure and a heat-dissipation structure. The circuit board is disposed in the housing. The heat-conduction structure is disposed in the housing and contacts the circuit board. The heat-dissipation structure is disposed outside the housing and connected to the heat-conduction structure, wherein heat is transmitted from the circuit board, passing the heat-conduction structure and the heat-dissipation structure to be dissipated out of the housing.

7 Claims, 9 Drawing Sheets

U.S. PATENT DOCUMENTS

| | | |
|---|---|---|
| 2004/0233640 A1 | 11/2004 | Itabashi et al. |
| 2005/0136967 A1 | 6/2005 | Jeon |
| 2005/0176471 A1* | 8/2005 | Masuda et al. ................ 455/566 |
| 2006/0198101 A1* | 9/2006 | Cho .............................. 361/687 |
| 2006/0198102 A1* | 9/2006 | Cho .............................. 361/688 |
| 2006/0215362 A1* | 9/2006 | Cho .............................. 361/687 |
| 2006/0264084 A1* | 11/2006 | Laitinen ........................ 439/326 |
| 2007/0275774 A1* | 11/2007 | Fagrenius et al. .......... 455/575.4 |
| 2008/0020813 A1* | 1/2008 | Choi et al. ................. 455/575.3 |

FOREIGN PATENT DOCUMENTS

| | | |
|---|---|---|
| TW | 585295 | 4/2004 |

* cited by examiner

PORTABLE ELECTRONIC DEVICE

BACKGROUND

The invention relates to a portable electronic device, and more particularly to a portable electronic device with a heat-dissipation function.

When a portable electronic device (for example, a personal digital assistant or a cell phone) performs wireless network communication or other high energy-consumption operations, heat produced by chips moves to light-emitting elements, batteries or other electronic elements thereof via a circuit board, raising the temperature thereof. This damages electronic elements and shortens lifespan. Additionally, battery charging chips produce high temperatures during the battery charging and such high temperatures may explode batteries (particularly lithium battery).

SUMMARY

An embodiment of a portable electronic device comprises a housing, a circuit board, a heat-conduction structure and a heat-dissipation structure. The circuit board is disposed in the housing. The heat-conduction structure is disposed in the housing and contacts the circuit board. The heat-dissipation structure is disposed outside the housing and connected to the heat-conduction structure, wherein heat is transmitted from the circuit board, passing the heat-conduction structure and the heat-dissipation structure to be dissipated out of the housing.

The invention reduces inner temperature of the portable electronic device, increases the lifespan of chips and light-emitting elements, and prevents batteries from exploding.

DESCRIPTION OF THE DRAWINGS

The invention will be more fully understood from the following detailed description and the accompanying drawings, given by the way of illustration only and thus not intended to limit the invention.

DETAILED DESCRIPTION

First Embodiment

Figure 1A:
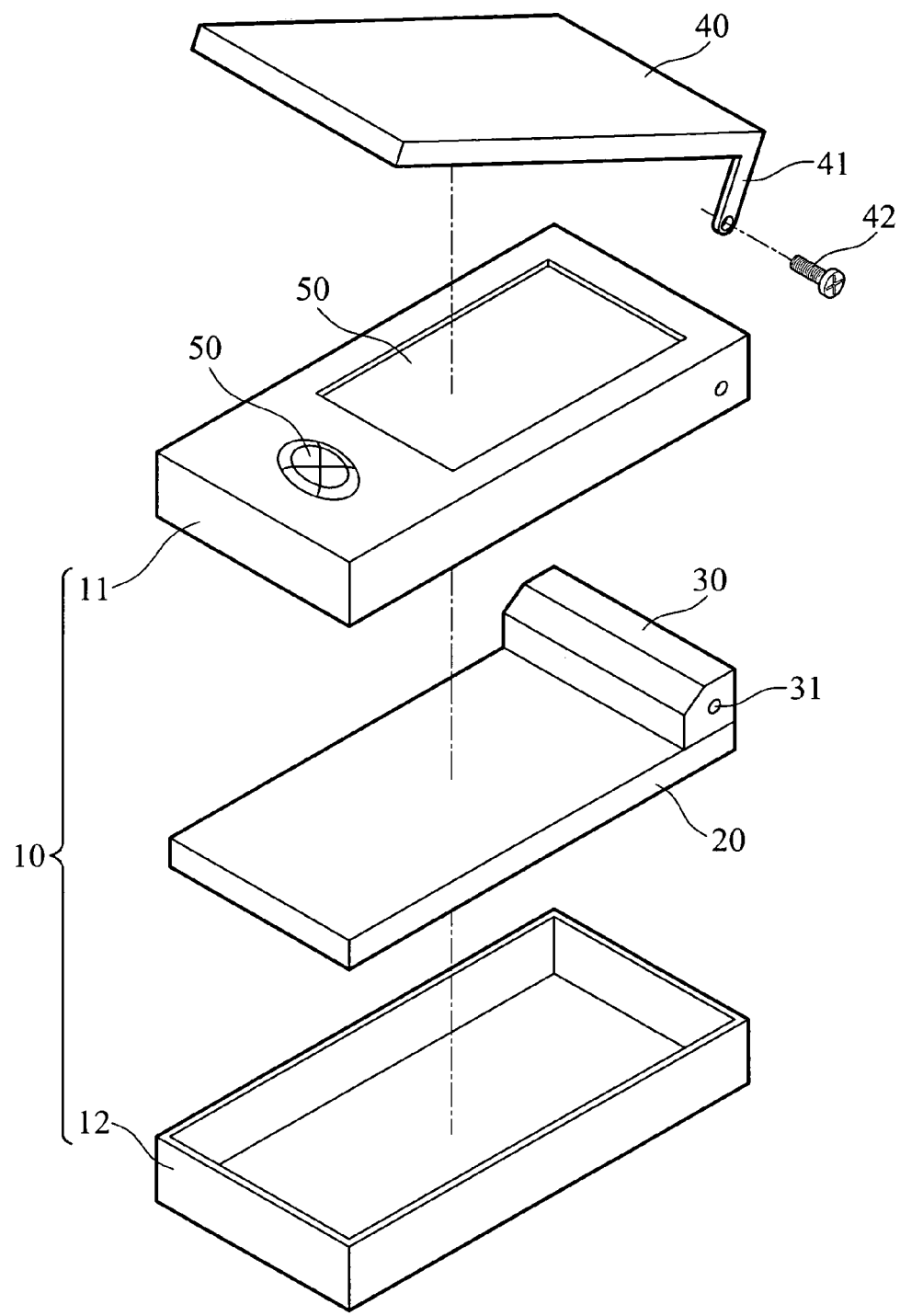
FIG. 1a is an exploded view of a portable electronic device of a first embodiment.
Figure 1B:
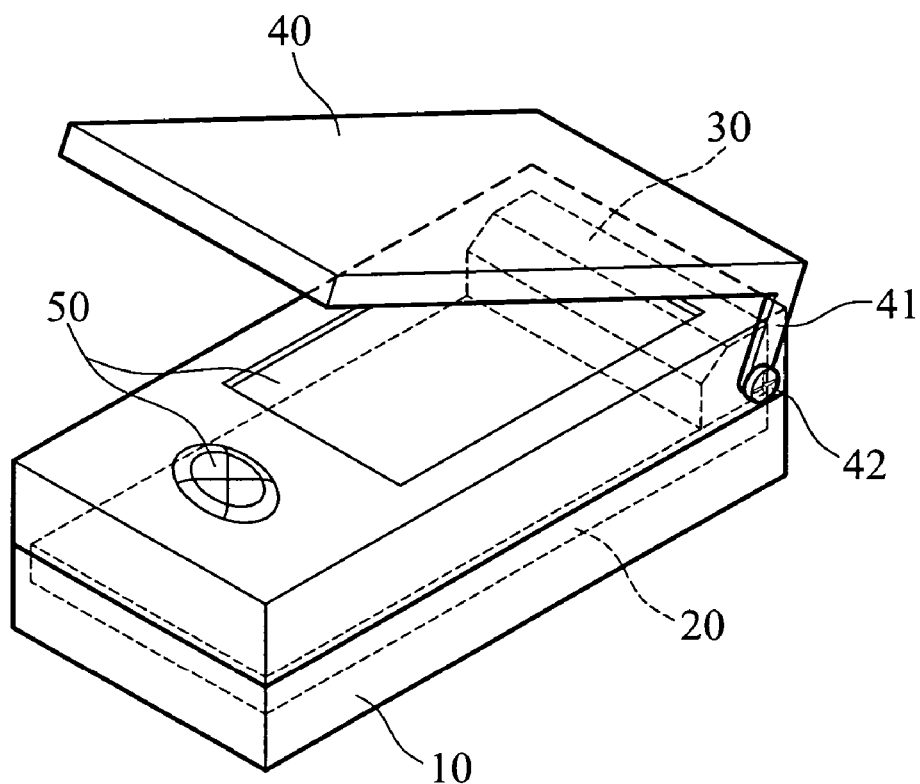
FIG. 1b shows an assembled portable electronic device of the first embodiment.

FIG. 1a is an exploded view of a portable electronic device 100 of the first embodiment, which comprises a housing 10, a circuit board 20, a heat-conduction structure 30, a heat-dissipation structure 40 and a control interface 50. The housing 10 comprises a first housing portion 11 and a second housing portion 12. The control interface 50 is disposed on the first housing portion 11. The circuit board 20 and the heat-conduction structure 30 are disposed in the housing 10. The heat-conduction structure 30 is disposed on the circuit board 20, comprising mounting holes 31. The heat-dissipation structure 40 is a cell phone cover comprising pivot portions 41. With reference to FIG. 1b, when the portable electronic device 100 is assembled, bolts 42 pass the pivot portions 41 and the housing 10 into the mounting holes 31 of the heat-conduction structure 30. The heat-dissipation structure 40 thus pivots on the heat-conduction structure 30.

In the disclosure, electronic elements (for example, chips and light-emitting elements) are not shown on the print circuit 20 to simplify description.

Figure 2:
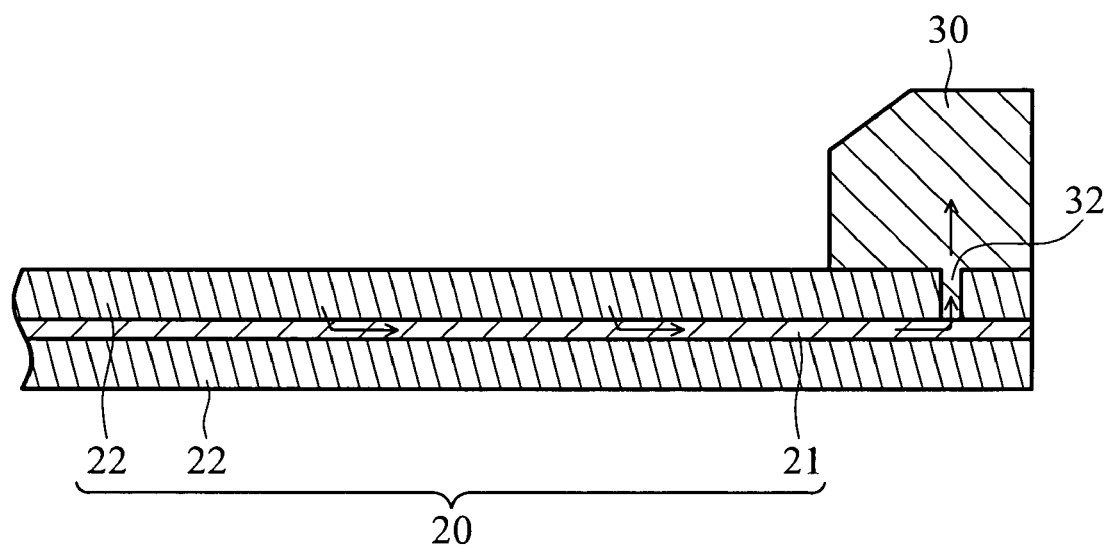
FIG. 2 is a sectional view of a circuit board and a heat-conduction structure of the first embodiment.
Figure 3:
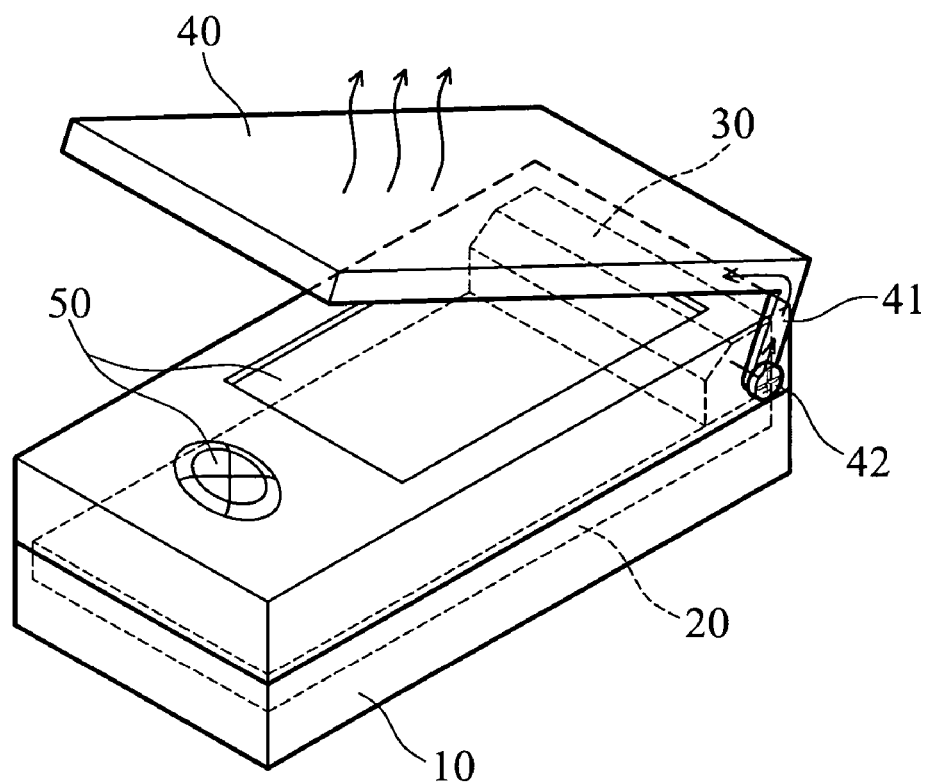
FIG. 3 shows heat dissipated out of the portable electronic device of the first embodiment.

FIG. 2 is a sectional view of the circuit board 20 and the heat-conduction structure 30. The circuit board 20 comprises a heat-conduction layer 21 and substrates 22. The heat-conduction layer 21 made of copper and sandwiched between the substrates 22. The heat-conduction structure 30 comprises a protrusion 32 inserted into the circuit board 20 and contacting the heat-conduction layer 21. When the portable electronic device performs wireless network communication, battery charging or other heat-producing operations, heat produced by the electronic elements on the circuit board 20 passes the substrate 22, the heat-conduction layer 21 and the protrusion 32 to the heat-conduction structure 30. With reference to FIG. 3, heat is transmitted from the heat-conduction structure 30, passing the bolts 42 and the pivot portions 41 to the heat-dissipation structure 40 for dissipation. The heat-dissipation structure 40 is of metal, particularly copper. The inner temperature of the portable electronic device 100 exceeds the external temperature. Thus, the heat is continuously transmitted from the electronic elements, passing the substrate 22, the heat-conduction layer 21, the heat-conduction structure 30, the bolts 42 and the pivot portions 41 to the heat-dissipation structure 40 to be dissipated.

Second Embodiment

Figure 4A:
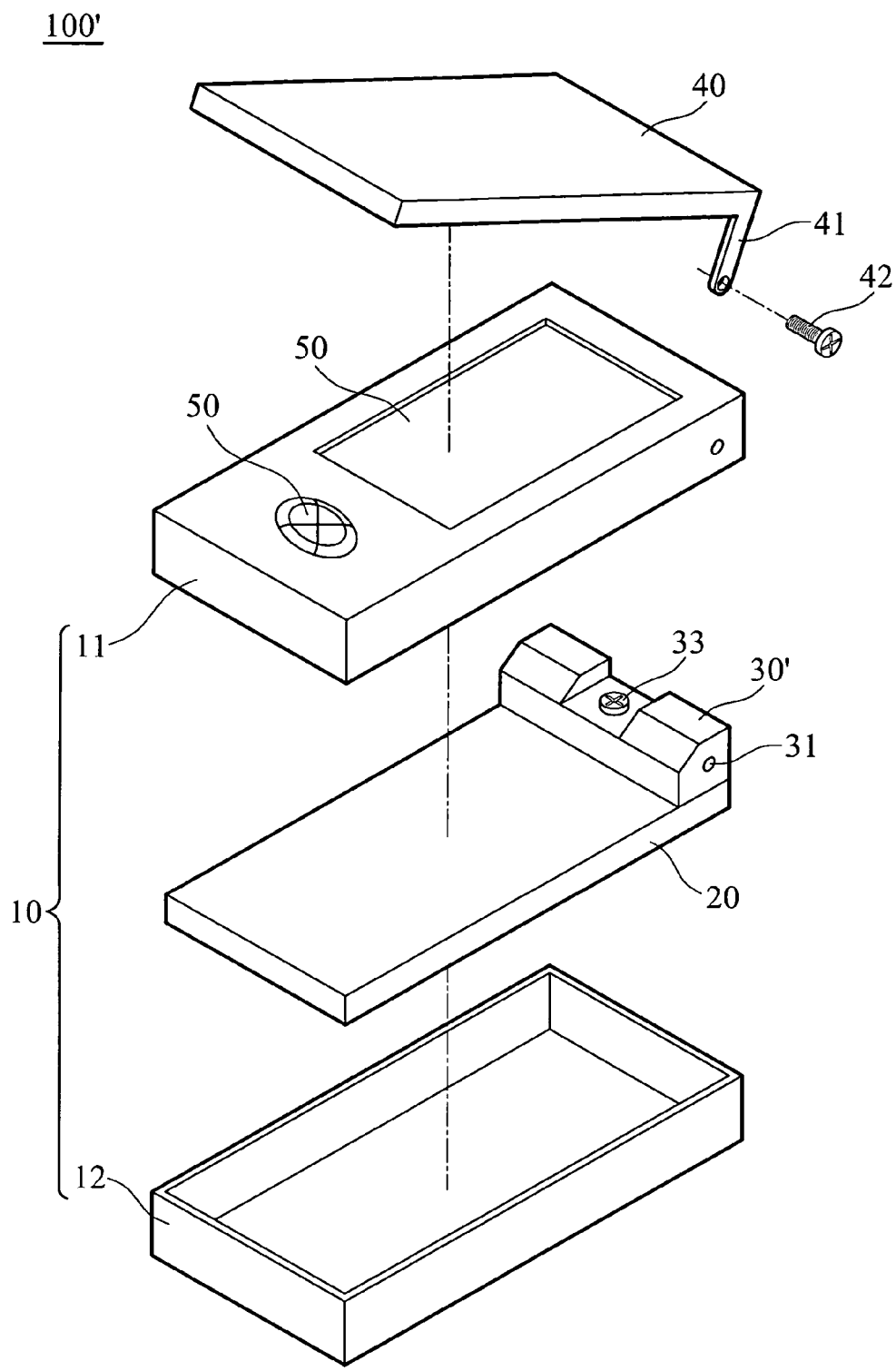
FIG. 4a is an exploded view of a portable electronic device of a second embodiment.
Figure 4B:
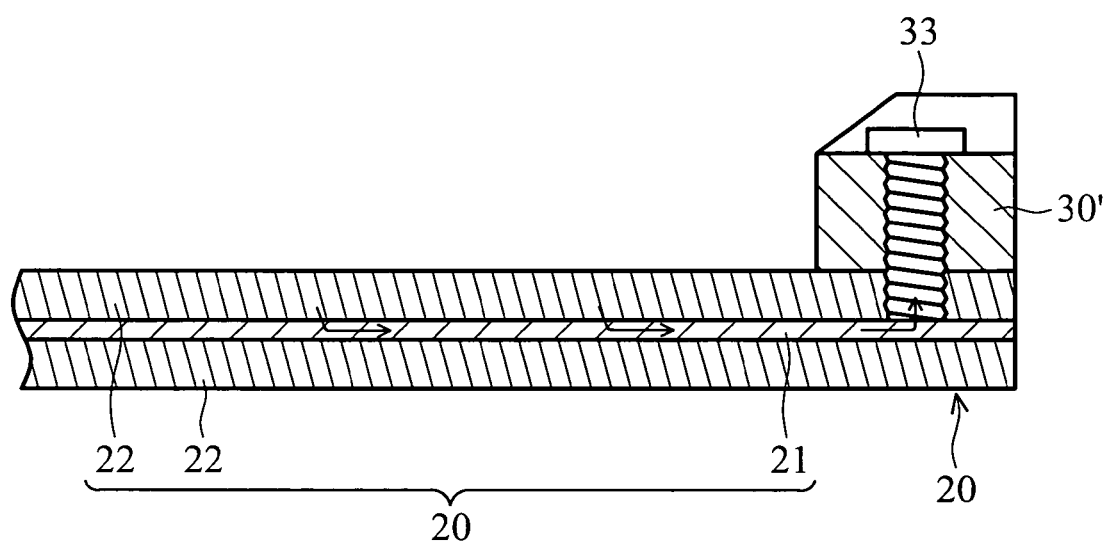
FIG. 4b is a sectional view of a circuit board and a heat-conduction structure of the second embodiment.

FIG. 4a is an exploded view of a portable electronic device 100' of a second embodiment, which differs from the first embodiment in the heat-conduction structure 30' being fixed on the circuit board 20 by bolt 33. With reference to FIG. 4b, the bolt 33 passes the substrate 22 and contacts the heat-conduction layer 21. Thus, heat produced by the electronic elements on the circuit board 20 passes the substrate 22, the heat-conduction layer 21 and the bolt 33 to the heat-conduction structure 30'.

Compared with the first embodiment, the second embodiment provides easier manufacturing and lower cost.

In the first and the second embodiments of the invention, the heat-dissipation structure 40 is a cell phone cover, but is not limited thereto. The heat-dissipation structure 40 can be a metal sheet disposed on a surface of the housing 10 or other structure.

Third Embodiment

Figure 5A:
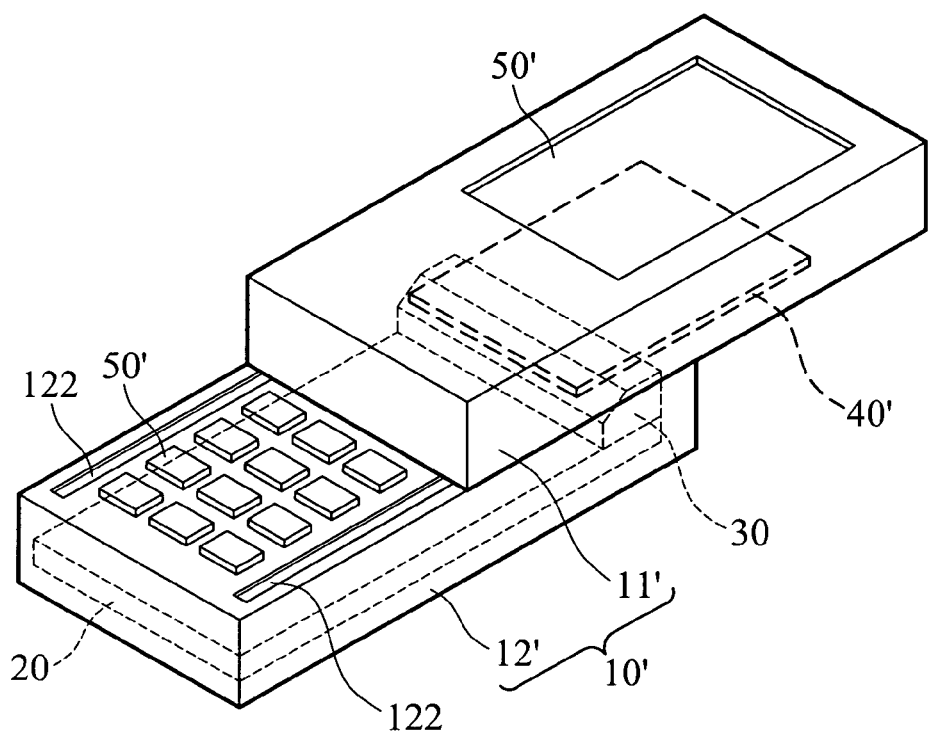
FIG. 5a shows a portable electronic device of a third embodiment.

FIG. 5a shows a portable electronic device 200 of a third embodiment of the invention, which is a slide phone comprising a housing 10', a circuit board 20, a heat-conduction structure 30, a heat-dissipation structure 40' and control interface 50'. The control interface 50' is disposed on the housing 10'. The housing 10' comprises a sliding cover 11' and a body 12'. The body 12' comprises grooves 122 allowing the sliding cover 11' to slide thereon. The circuit board 20 and the heat-conduction structure 30 are disposed in the body 12'. The heat-dissipation structure 40' is a metal sheet disposed on the surface of the sliding cover 11'.

Figure 5B:
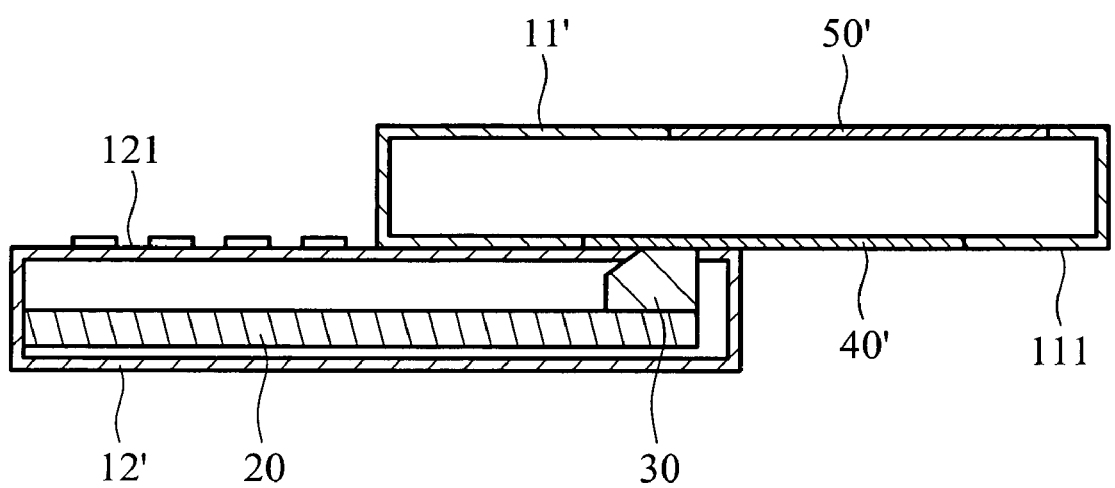
FIG. 5b is a sectional view of a circuit board and a heat-conduction structure of the third embodiment.
Figure 5C:
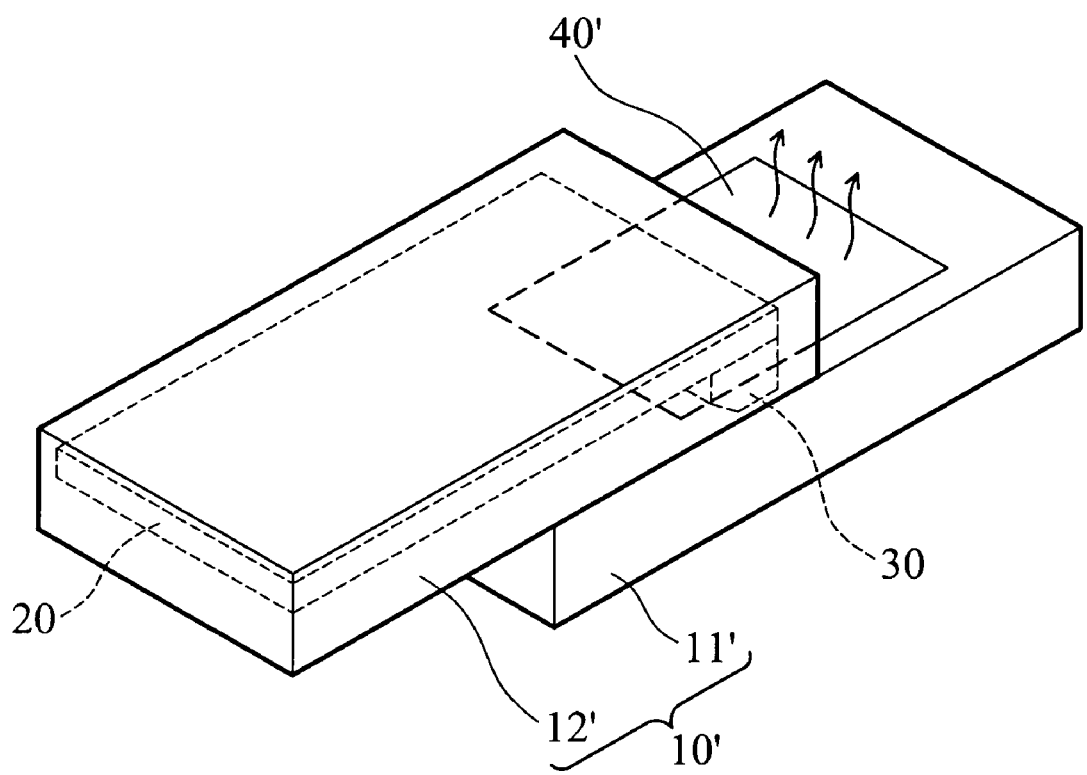
FIG. 5c shows heat dissipated out of the portable electronic device of the third embodiment.

As shown in FIG. 5b, in the third embodiment, the top of the heat-conduction structure 30 is exposed on a first surface 121 of the body 12'. The heat-dissipation structure 40' is disposed on a second surface 111 of the sliding cover 11'. The top of the heat-conduction structure 30 directly contacts the heat-dissipation structure 40'. As shown in FIG. 5c, heat inside the portable electronic device 200 thus is transmitted to the heat-dissipation structure 40' to be dissipated.

In this embodiment, the portable electronic device 200 is a slide phone, but is not limited thereto. The portable electronic device 200 can be a rotating phone or other. The heat-dissipation structure 40' is not limited to disposition on the cover, and can be disposed on other locations on the portable electronic device 200.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A portable electronic device, comprising:
a housing comprising a sliding cover and a body, the sliding cover slidingly connecting the body;
a circuit board, disposed in the housing;
a heat-conduction structure, disposed in the housing and contacted with the circuit board for dissipating a heat from the circuit board, wherein the circuit board comprises a heat-conduction layer embedded in the circuit board and contacted with the heat-conduction structure, and the heat-conduction layer extends parallel to the circuit board to transmit the heat parallel thereto, wherein heat-conduction structure comprises a protrusion inserted into the circuit board and contacted with the heat-conduction layer; and
a heat-dissipation structure, disposed outside the housing and contacted with for dissipating the heat out of the housing from the heat-conduction structure, wherein the circuit board and the heat-conduction structure are disposed in the body, and the heat-dissipation structure is disposed on a surface of the sliding cover.

2. The portable electronic device as claimed in claim 1, wherein a material of the heat-conduction structure comprises metal.

3. The portable electronic device as claimed in claim 2, wherein the metal comprises copper.

4. The portable electronic device as claimed in claim 1, wherein the protrusion is a bolt inserted into the circuit board, contacted with the heat-conduction layer, and fixed the heat-conduction structure on the circuit board.

5. The portable electronic device as claimed in claim 1, wherein a material of the heat-conduction layer comprises metal.

6. The portable electronic device as claimed in claim 5, wherein the metal comprises copper.

7. The portable electronic device as claimed in claim 1, wherein the combination of the protrusion and the heat-conduction structure is a single-piece structure.

* * * * *